US012798647B2

(12) United States Patent
Manganaro

(10) Patent No.: US 12,798,647 B2
(45) Date of Patent: Nov. 17, 2026

(54) CART FOR CONSTRUCTION MATERIALS

(71) Applicant: Manganaro Equipment, LLC, Woburn, MA (US)

(72) Inventor: David Manganaro, Winchester, MA (US)

(73) Assignee: Manganaro Equipment, LLC, Woburn, MA (US)

( * ) Notice: Subject to any disclaimer, the term of this patent is extended or adjusted under 35 U.S.C. 154(b) by 267 days.

(21) Appl. No.: 18/396,513

(22) Filed: Dec. 26, 2023

(65) Prior Publication Data

US 2025/0206364 A1 Jun. 26, 2025

(51) Int. Cl.
*B62B 3/10* (2006.01)
*B62B 3/00* (2006.01)
*B62B 5/00* (2006.01)

(52) U.S. Cl.
CPC .............. *B62B 3/108* (2013.01); *B62B 3/008* (2013.01); *B62B 5/0003* (2013.01); *B62B 2203/20* (2013.01)

(58) Field of Classification Search
CPC .............................. B62B 13/108; B62B 13/16
See application file for complete search history.

(56) References Cited

U.S. PATENT DOCUMENTS 2,572,355 A * 10/1951 Kintz ..................... A47B 81/00 211/41.16
2,808,157 A * 10/1957 Terrill ....................... B66F 9/12 108/52.1
3,845,969 A 11/1974 Nadeau
3,871,054 A 3/1975 Schaefer
3,889,814 A * 6/1975 Rice .......................... B62B 3/10 D34/21
4,050,671 A * 9/1977 Coleman ................. B62B 3/108 254/7 R
4,138,099 A 2/1979 Engelhart
4,630,838 A 12/1986 Stockton
4,793,624 A 12/1988 Mace
(Continued)

FOREIGN PATENT DOCUMENTS

CN 110304126 A * 10/2019 ............. B62B 3/108
GB 2198395 A * 6/1988 ............. B62B 3/108

*Primary Examiner* — Katy M Ebner
(74) *Attorney, Agent, or Firm* — Hinckley, Allen & Snyder, LLP; Stephen J. Holmes

(57) ABSTRACT

A wheeled cart for transporting building materials, such as doors, includes a deck, an upright support frame at a rear end of the deck, a rearward support ledge at a rearward end of the deck, the rearward support ledge including an upright support flange having a plurality of spaced upwardly opening slots, each slot having flexible bumper surfaces, a forward support ledge at a forward end of the deck, the forward support ledge including an upright support flange having a plurality of spaced upwardly opening slots, each slot having flexible bumper surfaces, and a rearward guide flange extending forwardly from the upright support frame, the rearward guide flange having a plurality of spaced forwardly opening slots, each slot having flexible bumper surfaces. Respective sets of spaced slots are aligned in cooperating planar relation to receive and vertically support a plurality of planar construction materials in spaced parallel relation.

11 Claims, 7 Drawing Sheets

(56) References Cited

U.S. PATENT DOCUMENTS

| | | | | |
|---|---|---|---|---|
| 5,120,072 | A * | 6/1992 | Laramie | B62B 3/009 280/47.17 |
| 5,226,656 | A * | 7/1993 | Mayer | E04F 21/0023 280/47.16 |
| 5,244,221 | A * | 9/1993 | Ward | B62B 1/14 414/490 |
| D340,337 | S | 10/1993 | Beasley | |
| 5,318,316 | A | 6/1994 | Shurtleff | |
| 5,564,723 | A * | 10/1996 | Breeden | B62B 3/04 410/97 |
| 6,123,208 | A * | 9/2000 | Haenszel | A47B 45/00 211/208 |
| 6,264,184 | B1 | 7/2001 | Armstrong | |
| 6,786,503 | B1 * | 9/2004 | Young | B62B 3/008 280/35 |
| 8,167,148 | B2 * | 5/2012 | Jacobson | G10G 5/00 108/193 |
| 10,336,356 | B2 * | 7/2019 | Dyson | B62B 3/02 |
| 10,577,006 | B1 * | 3/2020 | Heffield | B62B 3/04 |
| 11,034,372 | B1 * | 6/2021 | Jordan | B62B 5/0003 |
| 2002/0113390 | A1 | 8/2002 | Hallman | |
| 2006/0087092 | A1 * | 4/2006 | Chubb | B65G 49/062 280/79.11 |
| 2006/0151967 | A1 | 7/2006 | Conway | |
| 2009/0020661 | A1 * | 1/2009 | Ludwig | B62B 3/108 248/510 |
| 2009/0194958 | A1 * | 8/2009 | Lin | B62B 3/16 280/47.35 |
| 2018/0312183 | A1 | 11/2018 | Sanford | |
| 2020/0316635 | A1 | 10/2020 | Ashe | |
| 2025/0065936 | A1 * | 2/2025 | Russo | B62B 3/002 |
| 2025/0128747 | A1 * | 4/2025 | Robinson | B62B 3/005 |

* cited by examiner

CART FOR CONSTRUCTION MATERIALS

BACKGROUND OF THE DISCLOSURE

(1) Field of the Invention

The instant disclosure generally relates to carts for storing and transporting building materials in the building and construction trades, and more particularly to a unique and novel cart for storing and transporting large heavy panel materials, and particularly wooden doors, which are easily subject to damage during storage and transportation as well as during staging for installation.

(2) Description of Related Art

Finish construction materials are particularly vulnerable to damage while being stored, as well as during transportation from the warehouse to the job site. Wooden doors are particularly heavy and difficult to maneuver and are typically handled individually requiring significant time and effort. Additionally, extra care must be taken to avoid bumping the doors into other surrounding materials or structures as these types of accidents can often cause marring, scratching and denting of the wood materials, potentially requiring repair or replacement.

To prevent damage, many doors are provided with cardboard packing around the edges which does help with damage control, but is not a perfect solution as each door is still handled individually.

There are also general purpose carts of the type found in home improvement stores, which can accommodate one or perhaps two doors and other types of planar or panel construction materials to facilitate movement, but they lack certain features which would be helpful to prevent damage.

SUMMARY OF THE DISCLOSURE

There is a need in the industry for a novel cart which can securely and safely hold a plurality of doors (or other panel materials) in parallel fixed relation to each other for both storage and transport.

According to exemplary embodiments of the invention, a cart in accordance with the present invention comprises a horizontal deck, a plurality of wheels supporting rolling movement of the deck, an upright support frame at a rear end of the deck, a rearward support ledge at a rearward end of the deck, the rearward support ledge including an upright support flange having a plurality of spaced upwardly opening slots, each slot having a flexible U-shaped bumper element, a forward support ledge at a forward end of the deck, the forward support ledge including an upright support flange having a plurality of spaced upwardly opening slots, each slot having a U-shaped flexible bumper element, and a rearward guide flange extending forwardly from said upright support frame, the rearward guide flange having a plurality of spaced forwardly opening slots, each slot having a flexible U-shaped bumper element.

Respective sets of spaced slots are aligned in cooperating planar relation to receive and vertically support a plurality of planar doors in spaced parallel relation.

The cart may further spaced forklift fork guides on the underside of left and right sides of the deck and the front and rear side of the deck.

The cart may further include a plurality of upwardly facing tubular stacking seats and a like plurality of downwardly facing stacking seats which are vertically aligned and configured and arranged to receive vertically extending support legs on the top and the bottom so that the carts may be stacked vertically for transportation. The upright support frame at the rear of the cart includes support leg pass through guides for receiving and guiding the vertically extending support legs.

The forklift fork guides facilitate lifting of the carts for stacking.

Some embodiments of the cart may further comprise a forward stabilizer bar having a plurality of slots in a rearward facing surface thereof and a laterally extending strap channel on a forward facing surface. A packing strap or removable ratcheting strap may be secured around the cart and stabilizer bar to further support the doors or panels in parallel spaced relation.

While embodiments of the invention have been described as having the features recited, it is understood that various combinations of such features are also encompassed by particular embodiments of the invention and that the scope of the invention is limited by the claims and not the description.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE EXEMPLARY EMBODIMENTS

Certain exemplary embodiments will now be described to provide an overall understanding of the principles of the structure, function, manufacture, and use of the device and methods disclosed herein. One or more examples of these embodiments are illustrated in the accompanying drawings.

Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Figure 1:
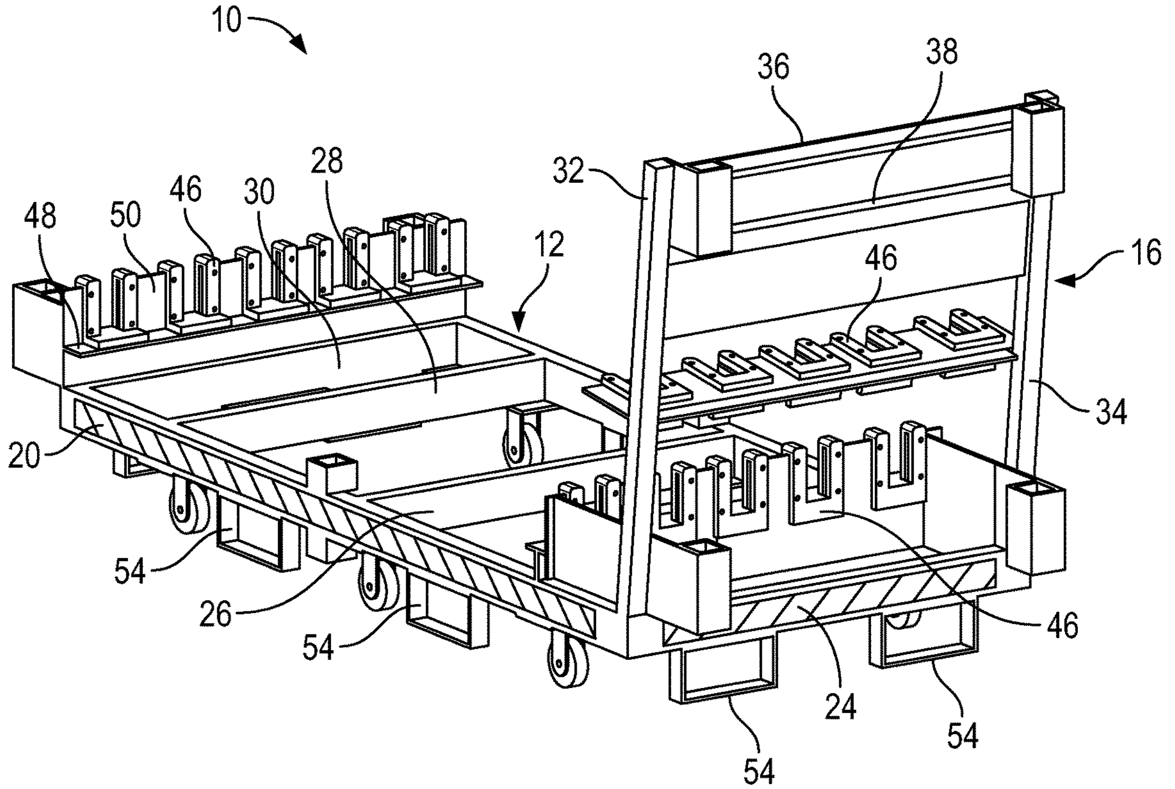
FIG. 1 is a perspective view of an exemplary embodiment of a cart in accordance with the teachings of the present disclosure.
Figure 2:
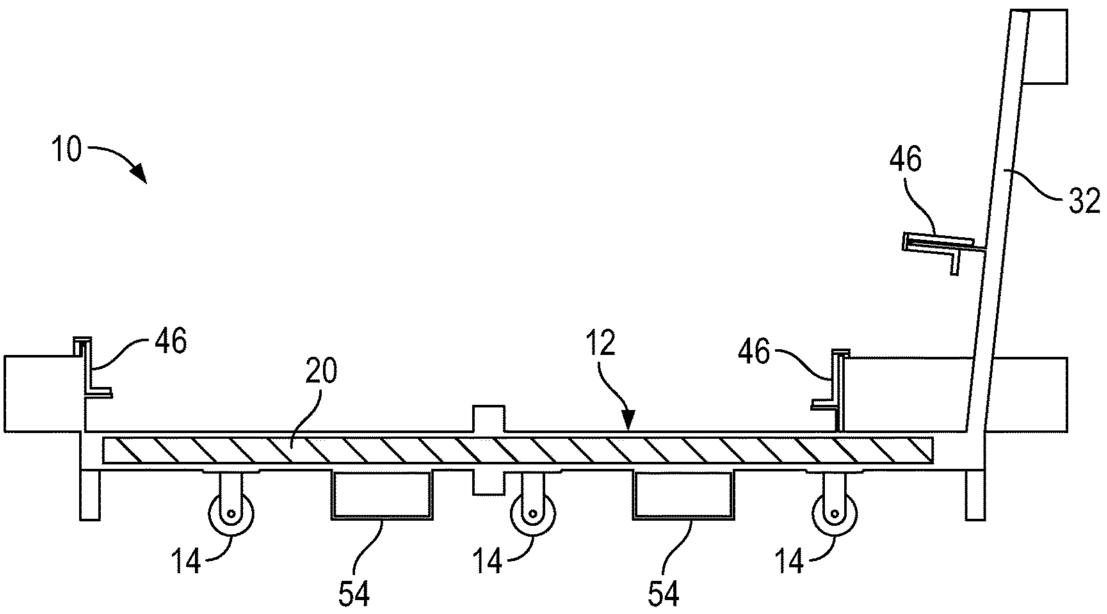
FIG. 2 is a left side view thereof.
Figure 3:
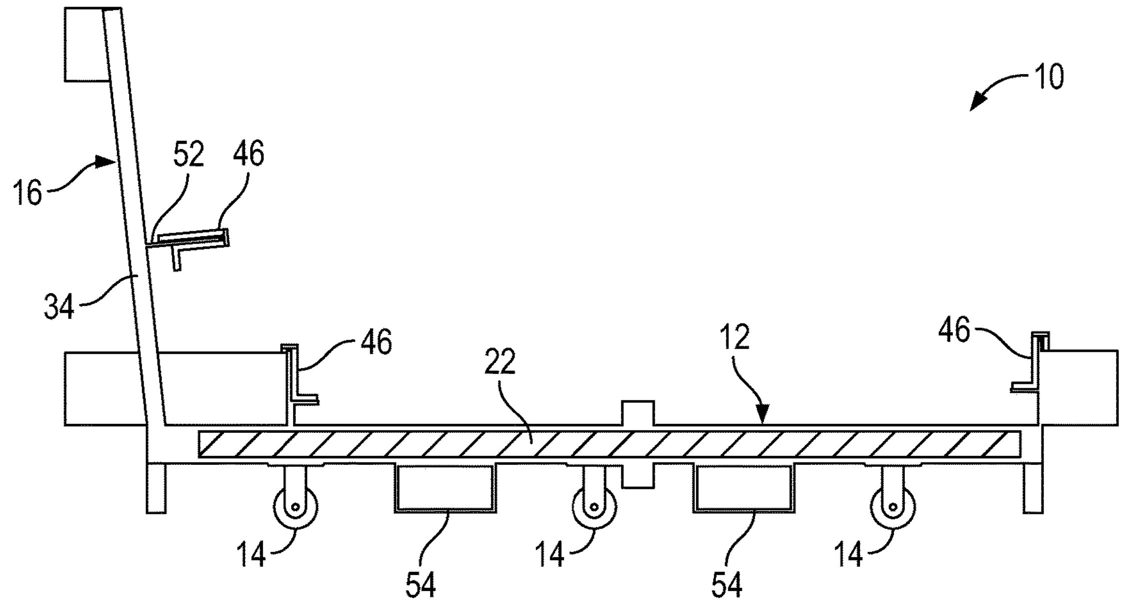
FIG. 3 is a right side view thereof.
Figure 4:
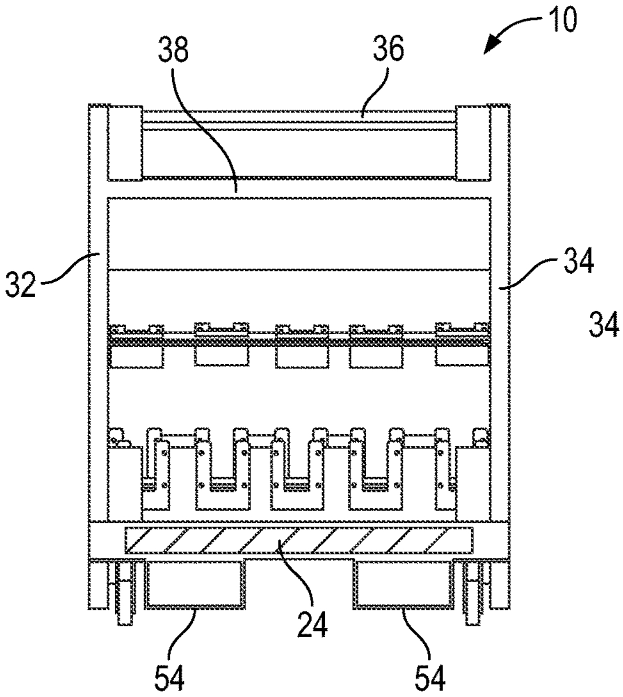
FIG. 4 is a rear view thereof.
Figure 5:
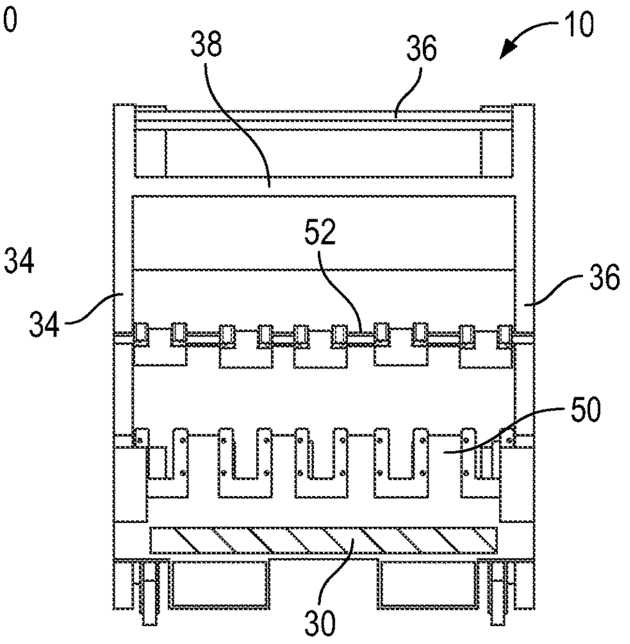
FIG. 5 is a front view thereof.
Figure 7:
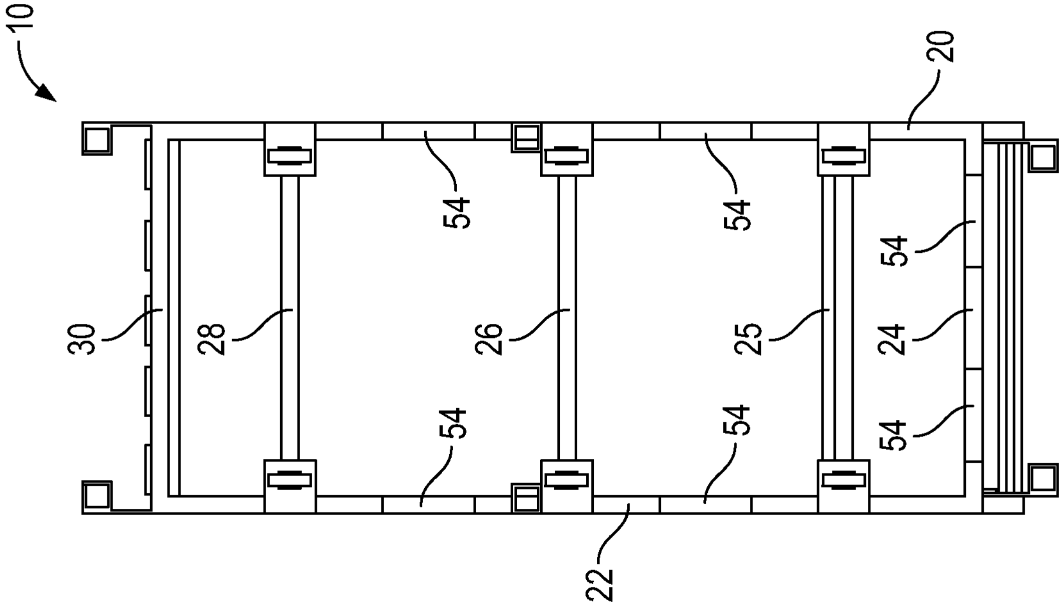
FIG. 7 is a bottom view thereof.
Figure 6:
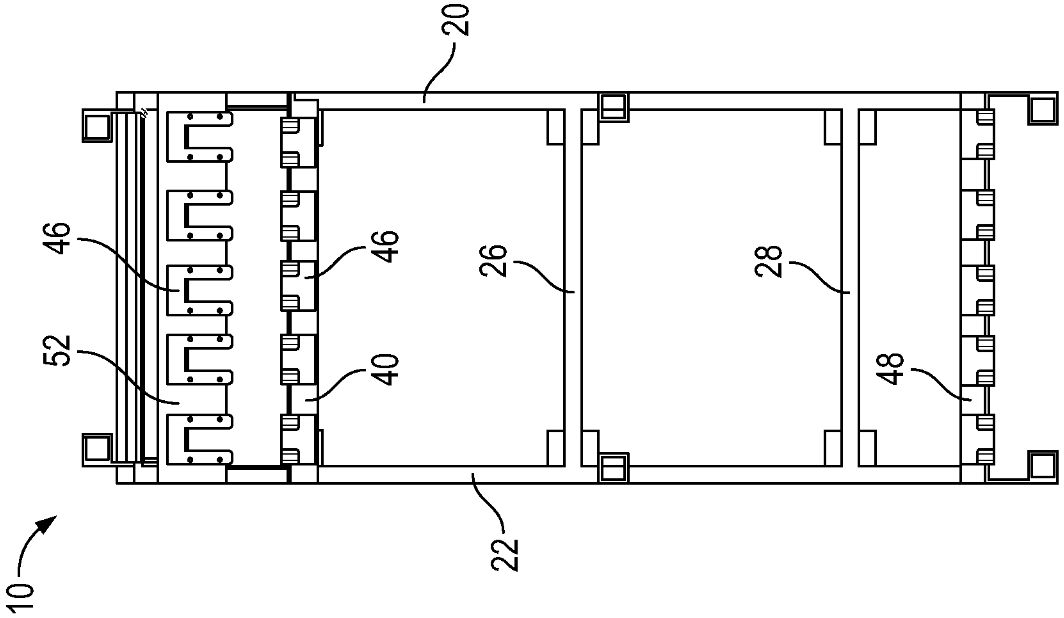
FIG. 6 is a top view thereof.

According to exemplary embodiments of the invention, and referring now to FIGS. 1-14, a cart 10 in accordance with the present invention generally comprises a horizontal deck 12, a plurality of wheels 14 supporting rolling movement of the deck and an upright support frame 16 at the rear end of the deck to generally define an L-shaped push/pull cart (see FIGS. 2 and 3). The cart 10 as illustrated is configured and arranged to support 5 individual doors 18 (or other similarly shaped panel construction materials) for storage and transport. While doors 18 may be specifically referred to herein, it should be understood that the reference is exemplary for explanation and the invention should not be so limited to doors per se. As will also be understood by anyone skilled in the art, the cart 10 can be configured for storage for any number of panels or doors.

The entire cart assembly 10 may be assembled from aluminum or steel components for strength and durability, although other plastic and composite materials may also be contemplated for construction.

The deck 10 may includes left and right parallel deck beams 20, 22 and a plurality of transverse tie bars 24, 25, 26, 28, 30 forming a generally rectangular deck frame. Similarly, the support frame 16 also includes left and right upright beams 32, 34 and transverse tie bars 36, 38. The support frame 16 may generally be used to push or pull the cart 10 as needed.

Figure 8:
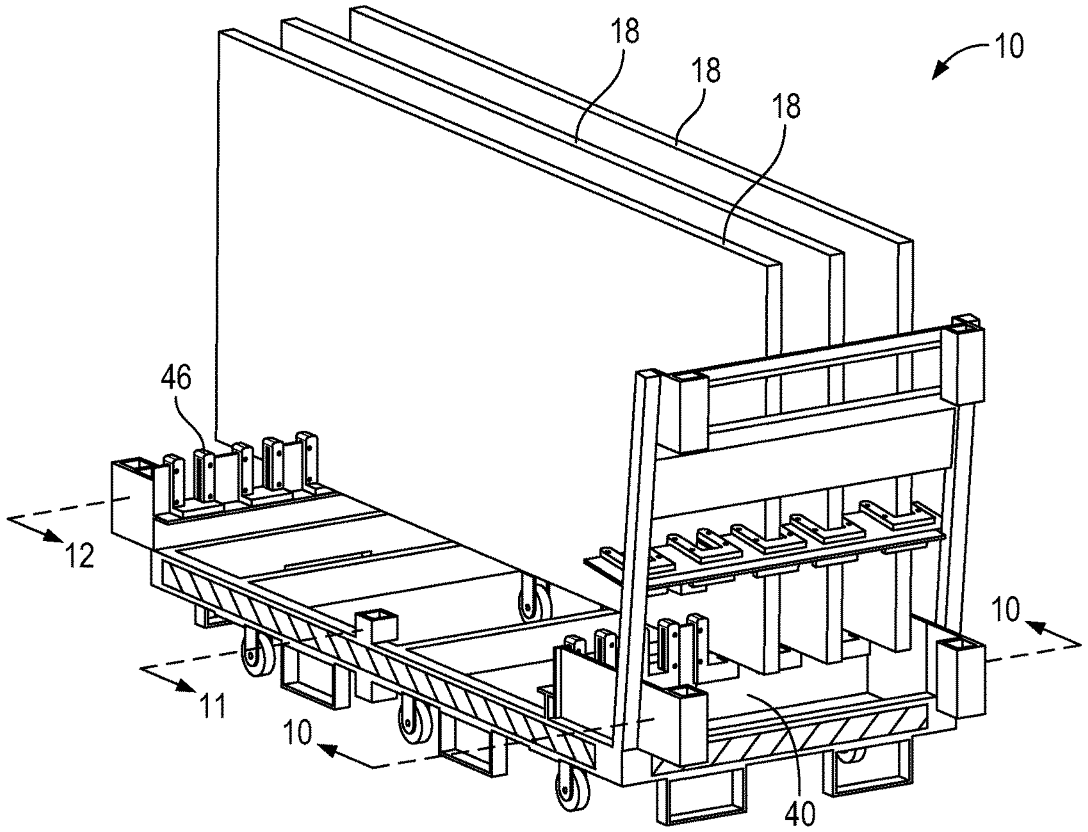
FIG. 8 is an enlarged rear perspective view thereof with several doors places within the guide bumper slots.
Figure 9:
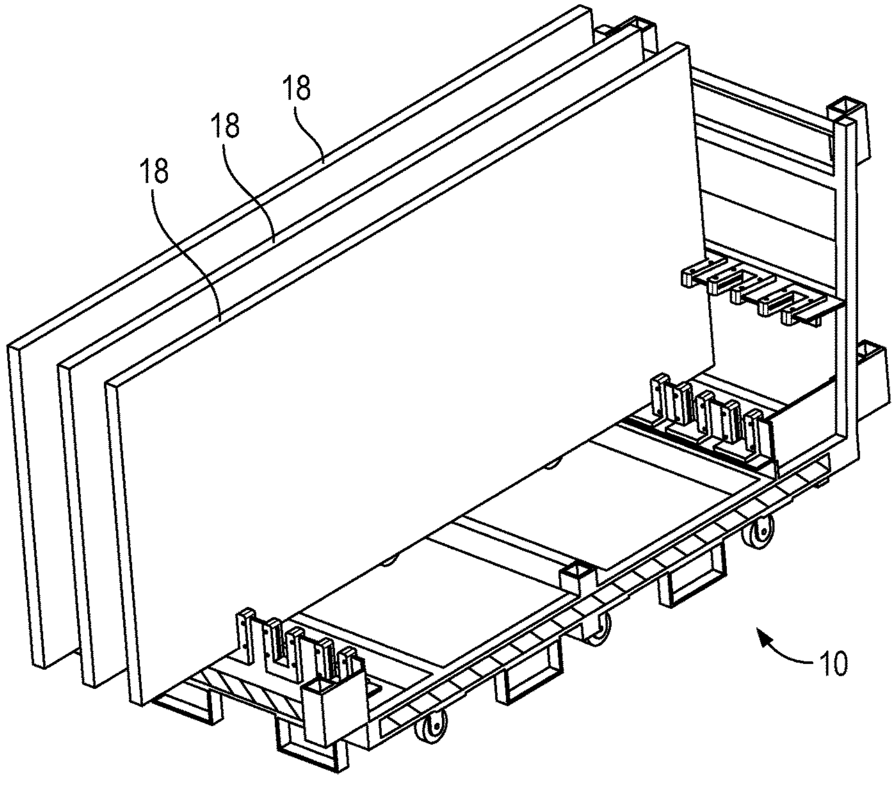
FIG. 9 is an enlarged front perspective view thereof.
Figure 15:
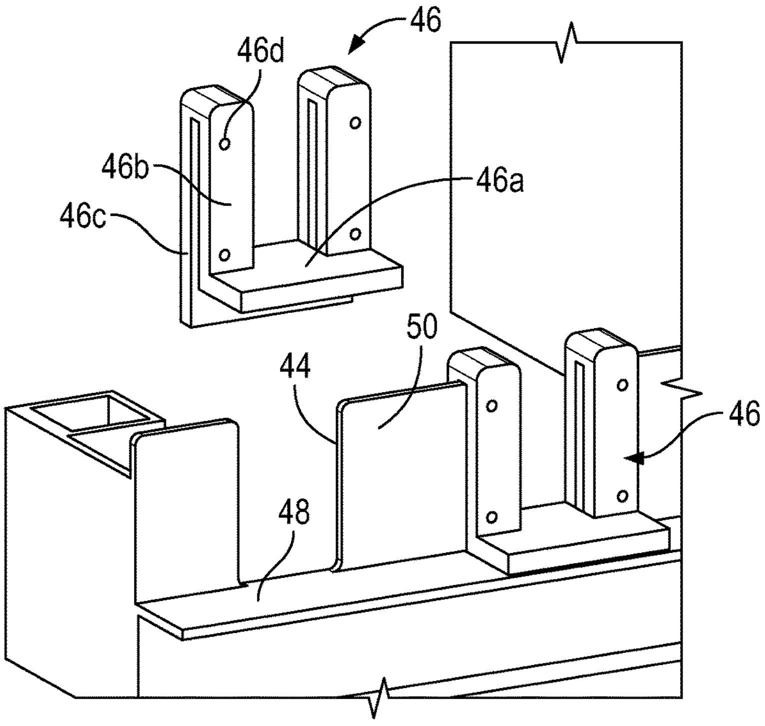
FIG. 15 is an enlarged perspective view of the U-shaped bumper element on the forward support ledge.

Referring to FIGS. 1, 8 and 9, to provide for support of the doors 18 on the cart, the deck 12 includes a support ledge 40 at a rearward end of the deck with the rearward support ledge 40 including an upright support flange 42 having a plurality of spaced upwardly opening slots 44 (See FIGS. 8 and 15). Each slot 44 has a flexible U-shaped bumper element 46 inserted into the flange slot 44.

The cart 10 further includes a forward support ledge 48 at a forward end of the deck, with the forward support ledge 48 also including an upright support flange 50 having a plurality of spaced upwardly opening slots 44. Each slot 44 having a U-shaped flexible bumper element 46.

To provide lateral spacing support, a rearward guide flange 52 extends forwardly from the upright support frame 16 with the rearward guide flange 52 having a plurality of spaced forwardly opening slots 44. Each slot 44 also has the same flexible U-shaped bumper elements 46.

The bumper elements 46 may comprise a single integrally molded U-shaped element as best illustrated in FIG. 15 including a horizontal portion 46A to support the door from below and upright vertical portions 46B for side support. The bumper elements 46 includes left and right channels 46C which slide over the U-shape flange slot 44 and may be secured in place with fasteners (not shown) through aligned holes 46D. The bumper elements 46 may alternatively be comprised of separate horizontal and vertical portions which can be secured or applied to the flanges and/or deck in a variety of ways including fasteners and/or adhesives.

The respective sets of spaced slots 44 and bumpers 46 are aligned in cooperating planar relation to receive and vertically support a plurality of planar doors, or the like, in spaced parallel relation (FIGS. 8 and 9).

The cart 10 may further include spaced forklift fork guides 54 on the underside of left and right sides of the deck and/or the front and rear sides of the deck.

In some transportation and storage scenarios, it may be advantageous to be able to stack the carts 10 one on top of the other. Referring now to FIGS. 8-13, the cart 10 may further include a plurality of upwardly facing tubular stacking seats and a like plurality of downwardly facing stacking seats 56, 58, 60 which are vertically aligned and configured and arranged to receive vertically extending support legs 62 on the top and the bottom.

Figure 10:
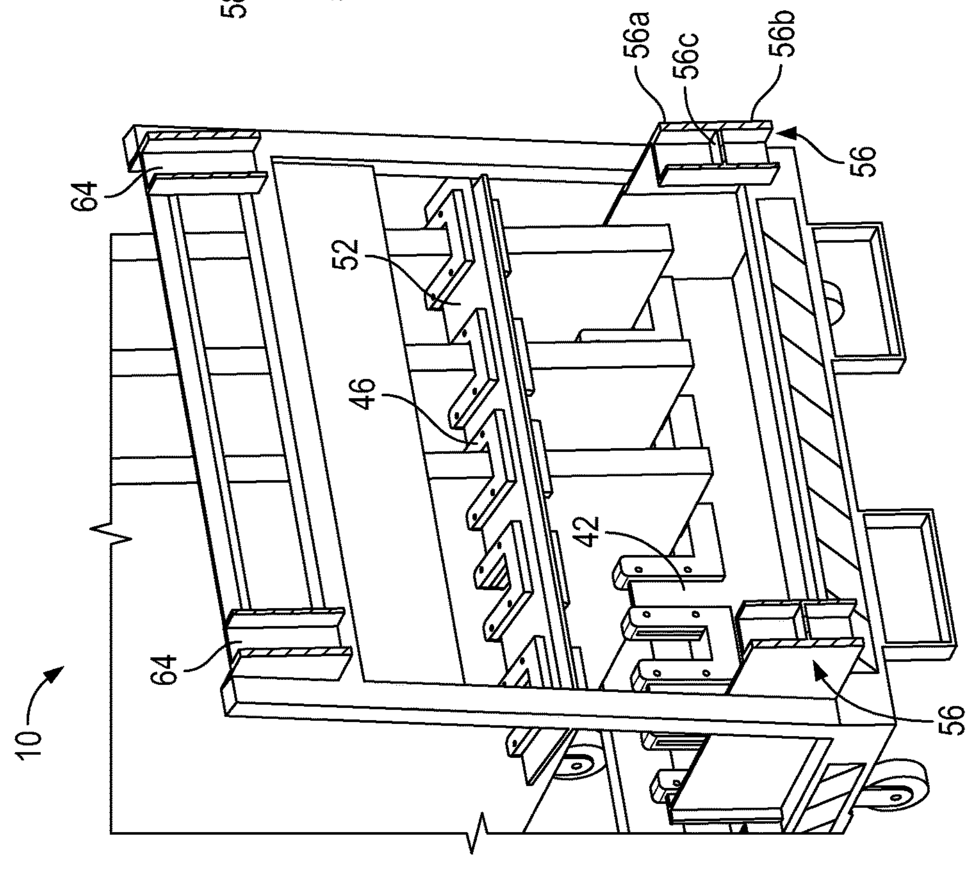
FIG. 10 is a partial cross-sectional view taken along line 10-10 of FIG. 8.

Referring to FIG. 10, the rear end of the cart includes corner stacking seats rear 56 on the deck which can be seen to include an upper seat 56A to receive a support leg 62 from the top and a lower seat 56B to receive a support leg from the bottom, separated by a wall 56C. The upright support frame 16 at the rear of the cart includes support leg pass through guides 64 aligned above the corner seats 56 for receiving and guiding the vertically extending support legs 62.

Figure 11:
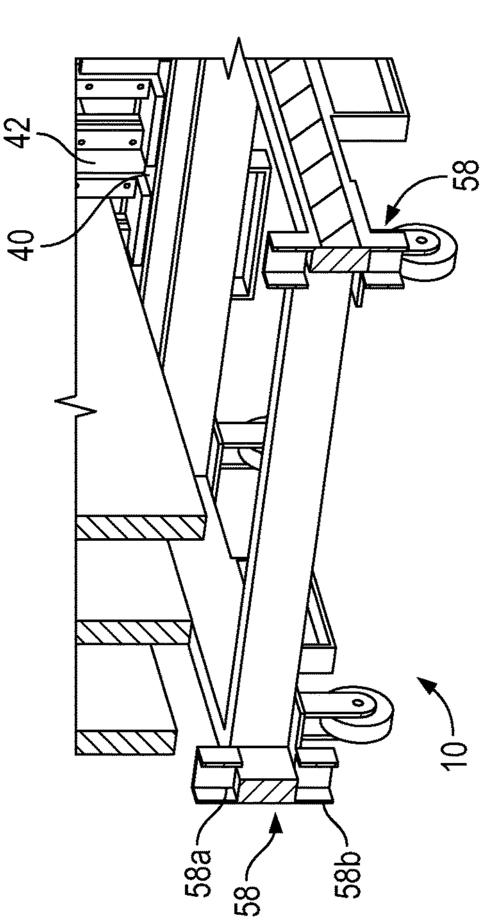
FIG. 11 is a partial cross-sectional view taken along line 11-11 of FIG. 8.

Referring to FIG. 11, the middle of the cart also includes stacking seats 58 wherein the upper seat portion 58A and lower seat portion 58*b* are formed on top of the left and right deck beams 20, 22.

Figure 12:
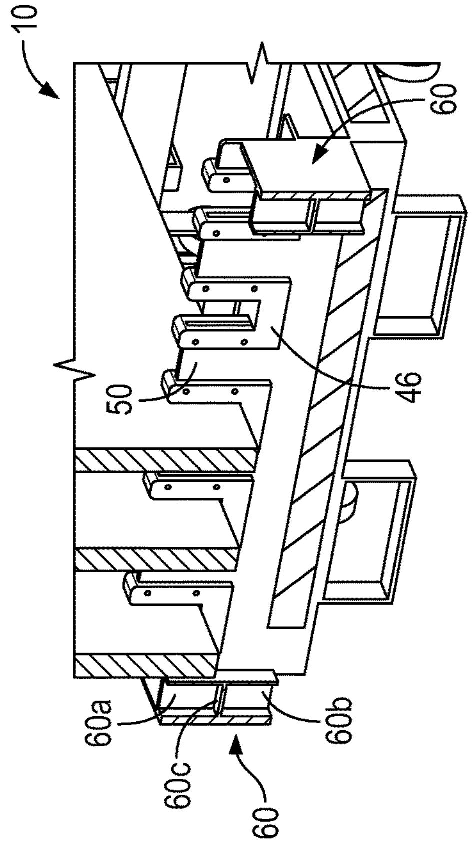
FIG. 12 is a partial cross-sectional view taken along line 12-12 of FIG. 8.

Referring to FIG. 12, the forward end of the cart includes corner stacking seats 60 on the deck which can also be seen to include an upper seat 60A to receive a support leg from the top and a lower seat 60B to receive a support leg from the bottom, separated by a wall 60C.

Figure 13:
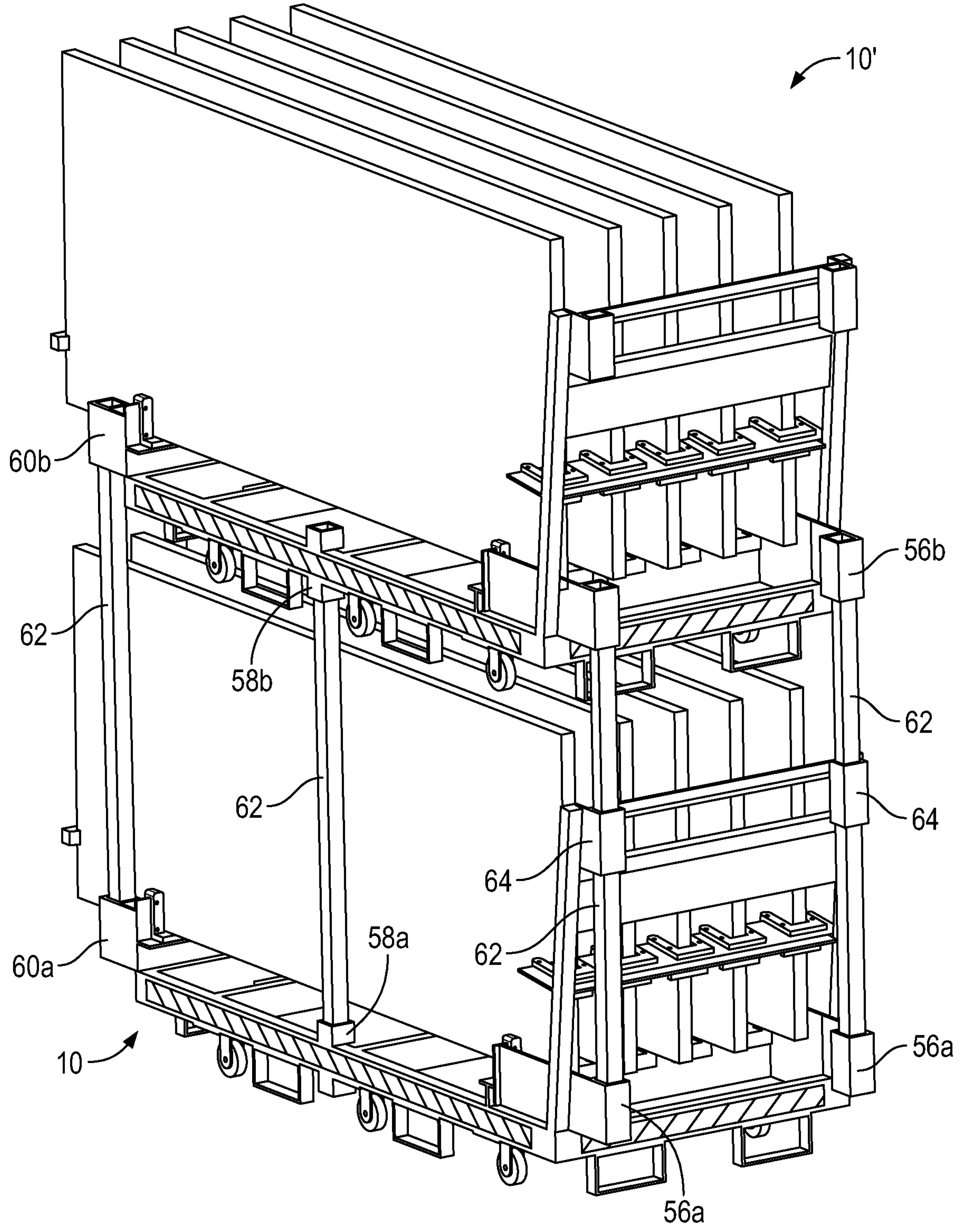
FIG. 13 is another perspective view of a pair of door carts of the present invention stacked on each other with a plurality of support columns.

FIG. 13 illustrates two carts 10, 10' stacked one upon the other with support legs 62 respectively inserted into the aligned upper and lower stacking seats 56, 58, 60 at the rear middle and front of the carts.

The forklift fork guides 54 facilitate lifting of the carts for stacking.

Figure 14:
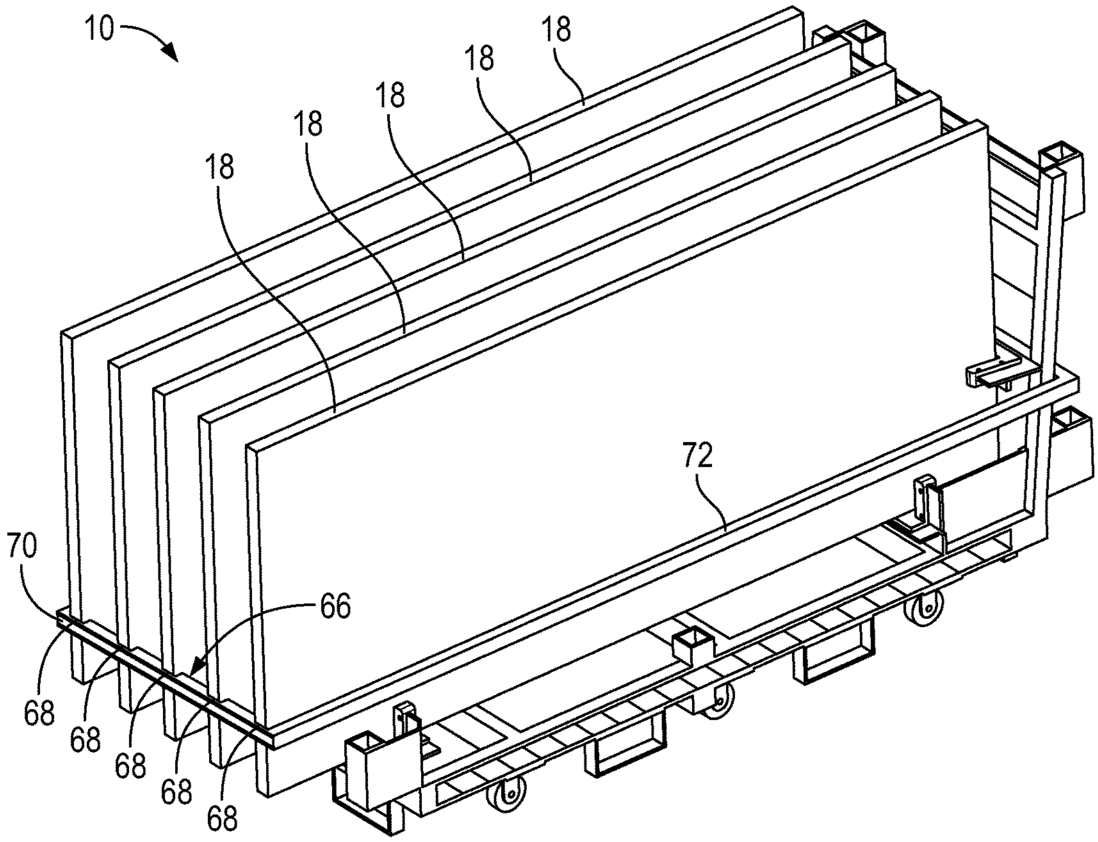
FIG. 14 is another perspective view illustrating an additional stabilizer bar strapped to the front end of the doors to further stabilize the doors relative to each other and the car.

Referring to FIG. 14, some embodiments of the cart may further comprise a forward stabilizer bar 66 having a plurality of slots 68 in a rearward facing surface thereof and a laterally extending strap channel 70 on a forward facing surface. A packing strap 72 or removable ratcheting strap may be secured around the cart and stabilizer bar 66 to further support the doors 18 in parallel spaced relation.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A cart for transporting wooden panel materials comprising:

a deck;

a plurality of wheels on the deck to support rolling movement of the deck;

an upright support frame at a rear end of the deck, a rearward support ledge extending above a rearward end of the deck, said rearward support ledge including an upright support flange having a plurality of spaced upwardly opening U-shaped slots, each U-shaped slot having flexible U-shaped bumper elements seated within each U-shaped slot;

a forward support ledge extending above a forward end of the deck, said forward support ledge including an upright support flange having a plurality of spaced upwardly opening U-shaped slots, each U-shaped slot having flexible U-shaped bumper elements seated within each U-shaped slot; and a rearward guide flange extending forwardly from said upright support frame, said rearward guide flange having a plurality of spaced forwardly opening U-shaped slots, each U-shaped slot having flexible U-shaped bumper elements, wherein respective sets of spaced U-shaped slots in said flanges are aligned in cooperating planar relation and are configured to receive and vertically support a plurality of wooden panel materials in spaced parallel relation, wherein each of said U-shaped bumper elements comprises a horizontal portion for bottom support, upright vertical portions for side support, and left and right channels which slide over the U-shaped flange slot, and wherein only the flexible U-shaped bumper elements engage the wooden panel materials.

2. The cart of claim 1 further comprising spaced forklift fork guides on the underside of left and right sides of the deck.

3. The cart of claim 1 further comprising spaced forklift fork guides on the underside of the front and rear end of the deck.

4. The cart of claim 2 further comprising spaced forklift fork guides on the underside of the front and rear end of the deck.

5. The cart of claim 1 further comprising a stabilizer bar having a plurality of slots in a rearward facing surface thereof and a laterally extending strap channel on a forward facing surface.

6. The cart of claim 1 further comprising:

a plurality of upwardly facing tubular stacking seats and a like plurality of downwardly facing stacking seats, said stacking seats each configured and arranged to receive a vertically extending support leg.

7. The cart of claim 6 wherein said upright support frame includes pass through guides for receiving said vertically extending support legs.

8. The cart of claim 2 further comprising:

a plurality of upwardly facing tubular stacking seats and a like plurality of downwardly facing stacking seats, said stacking seats each configured and arranged to receive a vertically extending support leg.

9. The cart of claim 8 wherein said upright support frame includes pass through guides for receiving said vertically extending support legs.

10. The cart of claim 4 further comprising:

a plurality of upwardly facing tubular stacking seats and a like plurality of downwardly facing stacking seats, said stacking seats each configured and arranged to receive a vertically extending support leg.

11. The cart of claim 10 wherein said upright support frame includes pass through guides for receiving said vertically extending support legs.

* * * * *